United States Patent
Suresh et al.

(10) Patent No.: US 12,180,787 B1
(45) Date of Patent: Dec. 31, 2024

(54) BEARING CLEARANCE ARRANGEMENT IN A TRICONE BIT

(71) Applicant: Caterpillar Inc., Peoria, IL (US)

(72) Inventors: Swetha Suresh, Chennai (IN); Ebi Bernard, Arakkonam (IN); Tamilmurasu Annadurai, Pudukkottai (IN); Akilan Appavu, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/227,718

(22) Filed: Jul. 28, 2023

(51) Int. Cl.
*E21B 10/22* (2006.01)

(52) U.S. Cl.
CPC .................................. *E21B 10/22* (2013.01)

(58) Field of Classification Search
CPC ........................................................ E21B 10/22
See application file for complete search history.

(56) References Cited

U.S. PATENT DOCUMENTS

| | | | |
|---|---|---|---|
| 3,363,702 A | 1/1968 | Bielstein |
| 3,663,073 A | 5/1972 | Bronson |
| 3,705,750 A | 12/1972 | Crow |
| 3,950,041 A | 4/1976 | Miglierini |
| 4,161,343 A | 7/1979 | Brashear |
| 4,279,316 A | 7/1981 | Helmick |
| 4,358,384 A | 11/1982 | Newcomb |
| 5,456,327 A | 10/1995 | Denton et al. |
| 5,668,092 A | 9/1997 | Denton |
| 5,868,502 A | 2/1999 | Cariveau et al. |
| 6,945,699 B2 | 9/2005 | Tibbits |
| 7,013,998 B2 | 3/2006 | Ray et al. |
| 7,121,365 B2 | 10/2006 | Denton et al. |
| 7,749,947 B2 | 7/2010 | Griffo et al. |
| 8,201,646 B2 | 6/2012 | Vezirian |
| 8,261,841 B2 | 9/2012 | Bailey et al. |
| 8,865,309 B2 | 10/2014 | Setlur et al. |
| 9,228,151 B1 | 1/2016 | Simonetti |
| 9,528,066 B2 | 12/2016 | Sui et al. |
| 10,119,335 B2 | 11/2018 | Bomidi et al. |
| 10,519,720 B2 | 12/2019 | Benes et al. |
| 2009/0038858 A1 | 2/2009 | Griffo et al. |
| 2017/0254151 A1* | 9/2017 | Finnman ............... E21B 10/18 |

FOREIGN PATENT DOCUMENTS

| | | |
|---|---|---|
| CN | 2780972 Y | 5/2006 |
| EP | 1066447 B1 | 9/1999 |
| WO | WO1999039075 | 8/1999 |

OTHER PUBLICATIONS

Written Opinion and International Search Report for Int'l. Patent Appln. No.PCT/US2024/033699, mailed Oct. 9, 2024 (12 pgs).

* cited by examiner

*Primary Examiner* — Kristyn A Hall

(57) ABSTRACT

A leg assembly of a tricone bit includes a cone and a leg fitting inside the cone. The leg includes an axis defining an axial center of rotation of the cone, a first raceway for a first row of bearings, a second raceway for a second row of bearings, and a third raceway for a third row of bearings disposed between the cone and the leg, at a distal end, at a middle section, and at a proximal end of the leg. A first clearance for the first row of bearings for the first raceway is less than a second clearance for the second row of bearings for the second raceway, which is less than a third clearance for the third row of bearings for the third raceway, such that the first row of bearings initially supports most of the radial load applied to the tricone bit.

20 Claims, 7 Drawing Sheets

BEARING CLEARANCE ARRANGEMENT IN A TRICONE BIT

TECHNICAL FIELD

The present disclosure relates to a bearing arrangement, and more particularly, to bearing clearance arrangements in a tricone bit.

BACKGROUND

Tricone bits, also referred to as tricone drill bits, rolling cutter bits, or roller-cone bits, are used in a variety of drilling applications. A tricone bit includes three leg assemblies, each of which facing inward. Each leg assembly contains a leg and a rotatable cone over the leg. Each cone is covered with teeth or inserts that cut into a material, as the cones rotate during the drilling process. Rolling elements, such as balls and rollers are located inside each cone in different rows. Raceways are formed between the outer surface of the leg and the inner surface of the cone. Together the rolling elements and raceways form a bearing or bearing assembly. The rolling elements help to reduce sliding friction and act as a buffer to allow free rotation of each cone of a tricone bit. However, high contact stresses are generated on the rolling elements and raceways of the tricone bit during the drilling process, and impact the life of the tricone bit.

CN U.S. Pat. No. 2,780,972Y by Wu et al. ("the '972 patent"), issued May 17, 2006, describes a rolling composite bearing structure of a roller bit. In particular, the '972 patent describes forming a rolling composite bearing structure of roller bearings and a journal in a large hole of a roller cone. The load on the bit first acts on the roller bearings, and, as the load acting on the roller bearings deforms the roller bearings, the surface of the large hole of the roller cone contacts the journal, thereby spreading the load over the roller bearings and the journal. However, as described in the '972 patent, being able to spread the load over the roller bearings and the journal depends on, or requires, the roller bearings to first deform to a certain degree to allow the journal to come in contact with the surface of the large hole of the roller cone.

The bearing arrangements described herein are directed to addressing one or more of the drawbacks set forth above.

SUMMARY

According to a first aspect, a leg assembly of a tricone bit includes a cone and a leg fitting inside the cone and having an axis defining an axial center of rotation of the cone. A first raceway is disposed between the cone and the leg at a distal end of the leg, referenced from a thrust button of the leg assembly, for a first row of bearings, a second raceway is disposed between the cone and the leg at a middle section of the leg for a second row of bearings, and a third raceway is disposed between the cone and the leg at a proximal end of the leg for a third row of bearings. The leg assembly of the tricone bit has a first clearance associated with the first row of bearings for the first raceway that is less than a second clearance associated with the second row of bearings for the second raceway, where the second clearance is less than a third clearance associated with the third row of bearings for the third raceway, such that the first row of bearings initially supports, in the first raceway, most of a radial load applied to the tricone bit during a drilling process. The second row of bearings distributedly supports the radial load with the first row of bearings in response to the radial load applied to the tricone bit is increased, and the third row of bearings distributedly supports the radial load with the first row of bearings and the second row of bearings in response to the radial load applied to the tricone bit is further increased. The second row of bearings may additionally, or alternatively, distributedly support the radial load with the first row of bearings in response to the first row of bearings wearing down, and the third row of bearings may additionally, or alternatively, distributedly support the radial load with the first row of bearings and the second row of bearings in response to the first row of bearings and the second row of bearings wearing down.

According to another aspect, a leg assembly of a tricone bit includes a leg and a cone rotatably mounted on the leg. The leg includes a first row of bearings, a second row of bearing, a third row of bearings, an axis defining an axial center of rotation, a first inner raceway disposed at a distal end of the leg, referenced from a thrust button of the leg assembly, a second inner raceway disposed at a middle section of the leg, and a third inner raceway at a proximal end of the leg. The cone rotates about the axis and includes a first outer raceway having a first outer diameter and forming a first raceway with the first inner raceway for the first row of bearings, a second outer raceway having a second outer diameter and forming a second raceway with the second inner raceway for the second row of bearings, and a third outer raceway having a third outer diameter and forming a third raceway with the third inner raceway for the third row of bearings with the third outer diameter being smaller than the first outer diameter. A first clearance associated with the first row of bearings for the first raceway is less than a second clearance associated with the second row of bearings for the second raceway, and the second clearance is less than a third clearance associated with the third row of bearings for the third raceway. In response to a radial load applied to the tricone bit during a drilling process, this clearance arrangement allows the first row of bearings to contact the first inner raceway and the first outer raceway contact, and initially support most of the radial load. In addition to the first row of bearings supporting the radial load, the second row of bearings and the third row of bearing progressively and distributedly support the radial load by the second row of bearings contacting the second inner raceway and the second outer raceway, and the third row of bearings contacting the third inner raceway and the third outer raceway, in response to the radial load applied to the tricone bit is increased. The second row of bearings and the third row of bearing may additionally, or alternatively, progressively and distributedly support the radial load in response to the first row of bearings wearing down, and then, in response to the second row of bearings wearing down.

According to yet another aspect, a tricone bit includes three leg assemblies. Each of the three leg assemblies includes a cone, a leg fitting inside the cone and having an axis defining an axial center of rotation of the cone. A first raceway is disposed between the cone and the leg at a distal end of the leg, referenced from a thrust button of the leg assembly, for a first row of bearings, a second raceway is disposed between the cone and the leg at a middle section of the leg for a second row of bearings, and a third raceway is disposed between the cone and the leg at a proximal end of the leg for a third row of bearings. Each leg of the tricone bit has a first clearance associated with the first row of bearings for the first raceway that is less than a second clearance associated with the second row of bearings for the second raceway, where the second clearance is less than a third clearance associated with the third row of bearings for the third raceway, such that the first row of bearings initially supports, in the first raceway, most of a radial load applied to the tricone bit during a drilling process. The second row of bearings distributedly supports the radial load with the first row of bearings in response to the radial load applied to the tricone bit is increased, and the third row of bearings distributedly supports the radial load with the first row of bearings and the second row of bearings in response to the radial load applied to the tricone bit is further increased. The second row of bearings may additionally, or alternatively, distributedly support the radial load with the first row of bearings in response to the first row of bearings wearing down, and the third row of bearings may additionally, or alternatively, distributedly support the radial load with the first row of bearings and the second row of bearings in response to the first row of bearings and the second row of bearings wearing down.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items. The figures may not be drawn to scale for clarity.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," and "approximately" are used to indicate a possible variation of ±10% in the stated value. Although the current disclosure will be described with reference to a tricone bit and tricone bit rolling elements, this is only exemplary. For instance, the current disclosure can be applied to components of any type of bit, such as roller cone bits, including not limited to, two cone bits and engineering bits.

Tricone bits of the present disclosure may be used in a variety of drilling applications. Exemplary drilling applications include applications within the following fields: oil, mining, construction, geothermal, tunnel boring, and water well excavation.

Figure 1:
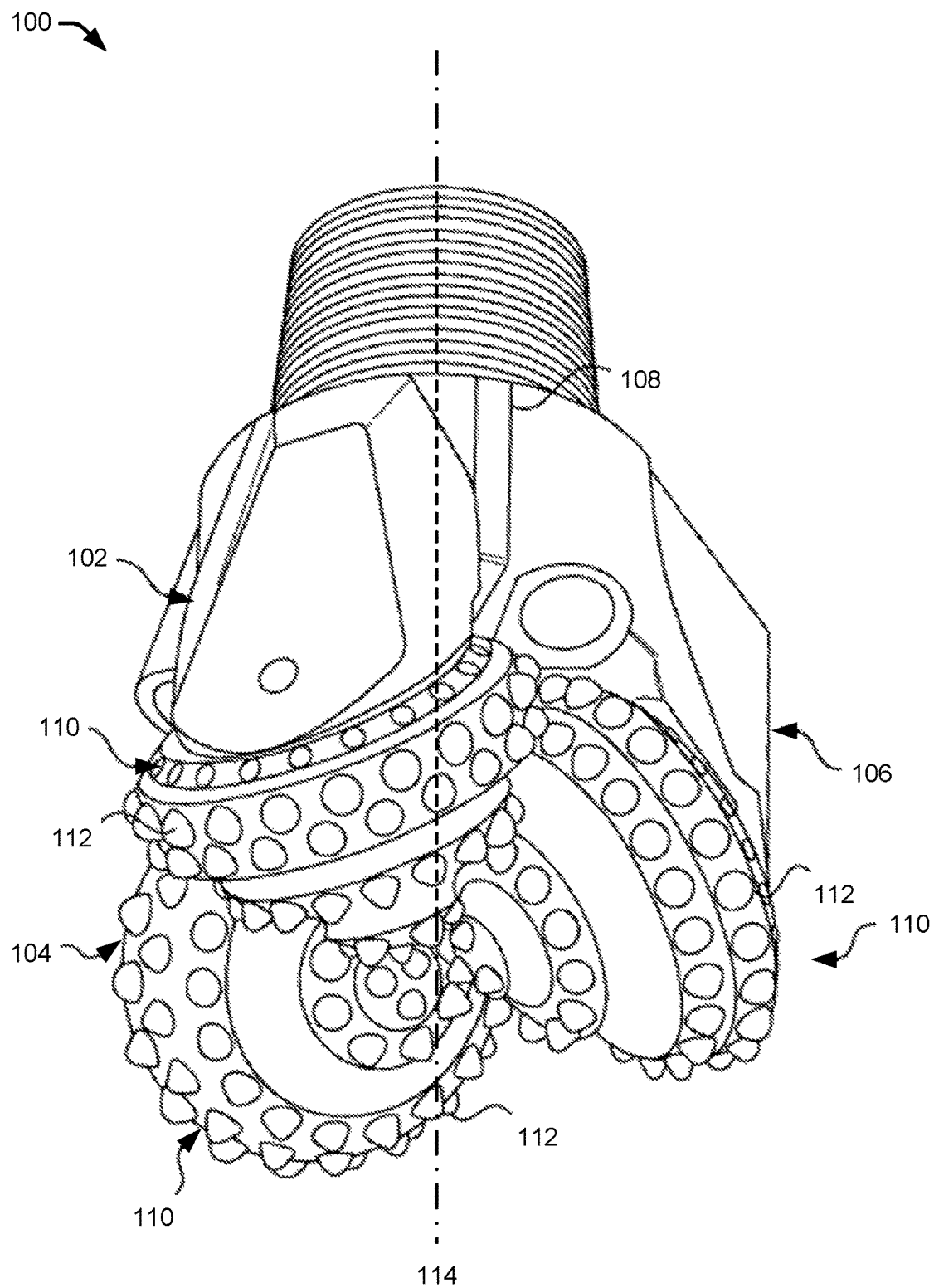
FIG. 1 illustrates a perspective view of an exemplary tricone bit.

FIG. 1 illustrates a perspective view of an exemplary tricone bit 100. The tricone bit 100 contains three leg assemblies 102, 104, and 106, which are joined together by welds 108 to form the tricone bit 100. Each leg assembly, 102, 104, and 106, contains a cone 110 that is rotatable. Each cone 110 has a plurality of teeth 112 that cut into a material, as the cone 110s of the leg assemblies, 102, 104, and 106, rotate during a drilling process while the tricone bit 100 itself rotates about a tricone bit axis 114, which defines an axial center of rotation of the tricone bit 100. The plurality of teeth may be inserts into the cone 110, or the cone 110 may be milled to form the plurality of teeth 112.

Each leg assembly, 102, 104, and 106, of the tricone bit 100 may contain bearings including a plurality of rolling elements moving within inner and outer bearing races or raceways. A bearing may constrain relative motion to only the desired motion, and may reduce friction between moving parts. In tricone bits, the rolling elements in each cone may provide for free rotation around the axis of the cone. Rolling elements reduce rotational friction and may support radial and axial loads. Exemplary types of bearings include roller bearings and ball bearings. Roller bearings may have rolling elements with a cylindrical, barrel, or tapered shape (hereinafter referred to as rollers), and ball bearings may have rolling elements in a spherical, ball-like shape (hereinafter referred to as balls). The rollers and balls of the bearings will be collectively referred to hereinafter as the rolling elements of the bearing.

The balls and/or rollers that are used in the cone of a tricone bit may be located between two races, or raceways. The two raceways may be an inner raceway and an outer raceway, and may form a raceway that contains the rolling elements and may transmit loads through the rolling elements. As one of the races rotates, it causes the rolling elements to rotate as well. Therefore, the rolling elements of the present disclosure may move along the raceway during rotation.

In some embodiments, the tricone bit may function by one of four different kinds of bearings. The bearings may be open roller bearings. A tricone bit with open roller bearings, which does not have a seal, and may allow rock and debris to enter into the cone. However, the tricone bit may employ high pressure air that travels down air passages into the tricone bearing, which may help to lubricate, cool, and remove particles from the tricone. A sealed roller bearing tricone bit may be sealed with any type of seal, including but not limited to an O-ring, and may be equipped with a lubrication and compensator system which may give it the ability to control leakage. A sealed journal bearing tricone bit may be configured to use a journal which rotates freely in a sleeve.

Figure 2:
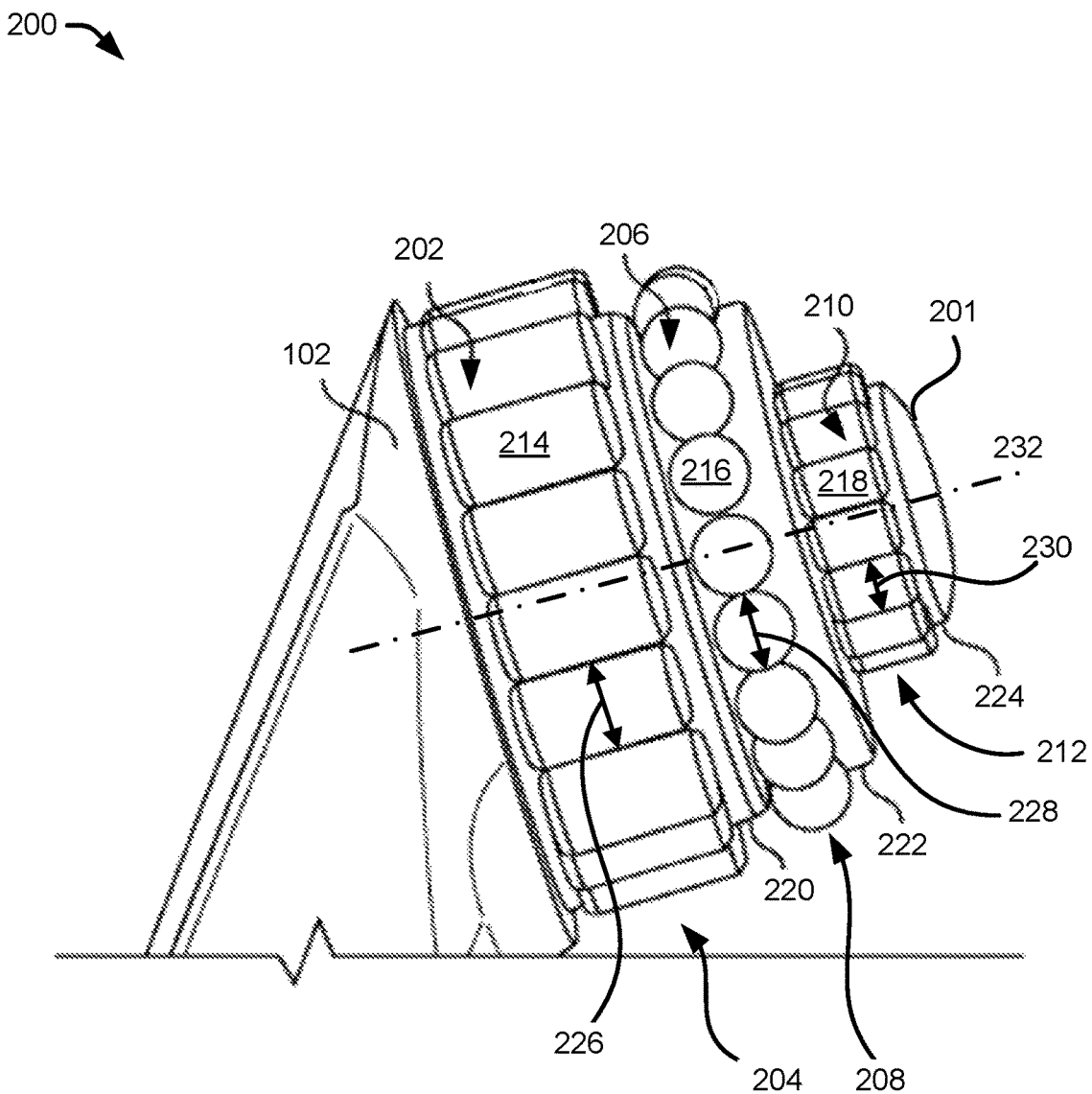
FIG. 2 illustrates a leg of the tricone bit with rolling elements.

FIG. 2 illustrates a leg 200 of the tricone bit 100 with rolling elements. FIG. 2 depicts an underlying configuration of the cone 110 of FIG. 1, i.e., the leg 200 which is the leg assembly 102 without the cone 110. The leg 200 contains three separate rows of bearings depicted as, referenced from a thrust button 201 of the leg 200, a first row of bearings 202 disposed at a distal end 204 of the leg 200, a second row of bearings 206 disposed at a middle section 208 of the leg 200, and a third row of bearings 210 disposed at a proximal end 212 of the leg 200. The first row of bearings 202 may contain a roller bearing having a plurality of first rolling elements 214 as rollers. The second row of bearings 206 may contain a ball bearing having a plurality of second rolling elements 216 as balls. The third row of bearings 210 may contain a roller bearing having a plurality of third rolling elements 218 as rollers. The plurality of first rolling elements 214 in the first row of bearings 202 is shown located within a first inner raceway 220, the plurality of second rolling elements 216 in the second row of bearings 206 is shown located within a second inner raceway 222, and the plurality of third rolling elements 218 in the third row of bearings 210 are shown located within a third inner raceway 224. A first rolling element 214 has a first diameter 226, a second rolling element 216 has a second diameter 228, and a third rolling element 218 has a third diameter 230. The leg 200 includes an axis 232 that defines an axial center of rotation of the cone 110. The first row of bearings 202 is capable of supporting higher radial load than both of the second row of bearings 206 and the third row of bearings 210.

Figure 3:
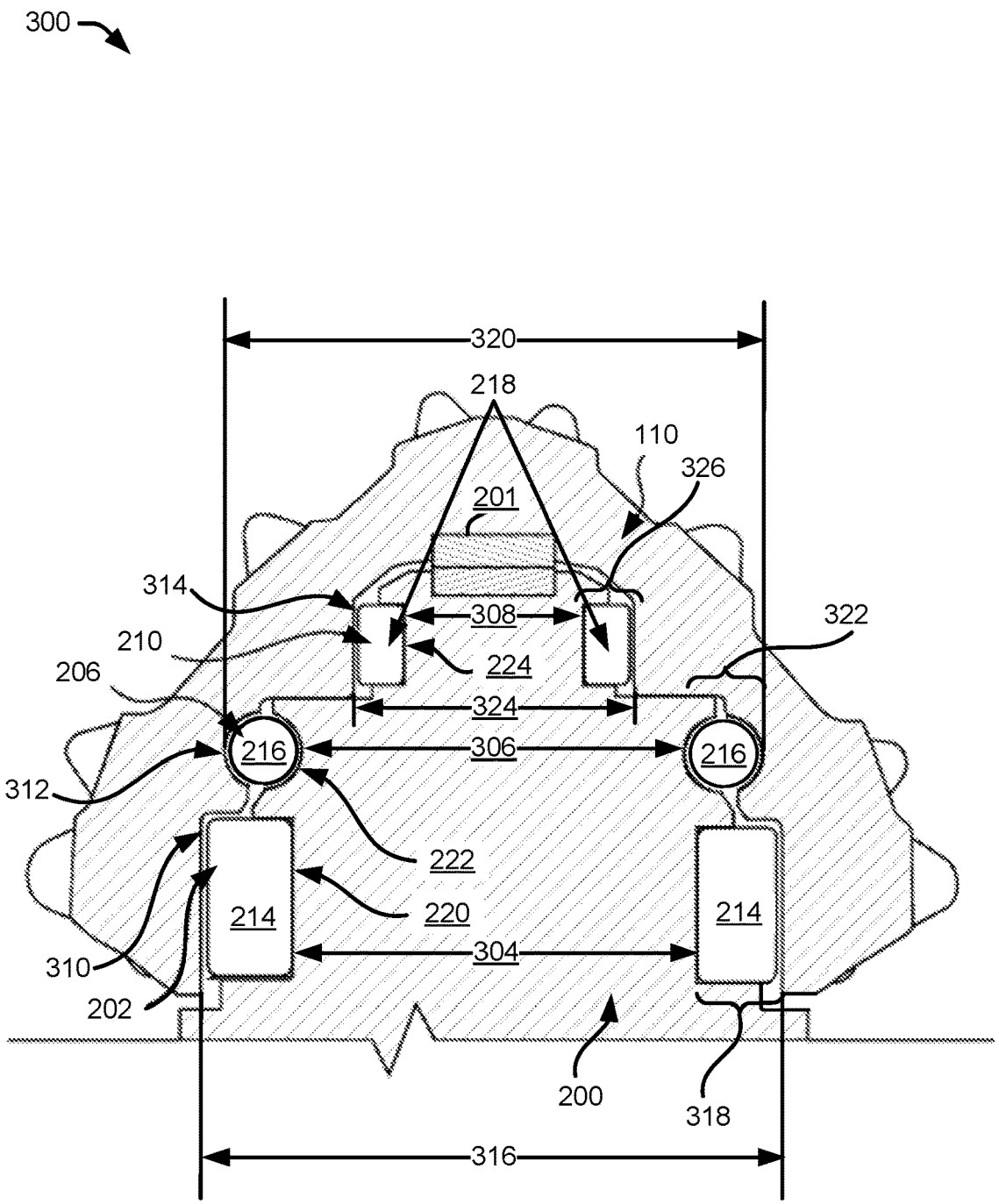
FIG. 3 illustrates a cross-sectional view of the cone and the leg containing rolling elements.

FIG. 3 illustrates a cross-sectional view 300 of the cone 110 and the leg 200 containing rolling elements. As described above with reference to FIG. 2, the leg 200 includes the first inner raceway 220, having a first inner diameter 304, for the first row of bearings 202, the second inner raceway 222, having a second inner diameter 306, for the second row of bearings 206, and the third inner raceway 224, having a third inner diameter 308, for the third row of bearings 210. The first rolling elements 214 in the first row of bearings 202 are shown located within the first inner raceway 220, the second rolling elements 216 in the second row of bearings 206 are shown located within the second inner raceway 222, and the third rolling elements 218 in the third row of bearings 210 are shown located within the third inner raceway 224. The second inner diameter 306 may be smaller than the first inner diameter 304, and the third inner diameter 308 may be smaller than the first inner diameter 304 and the second inner diameter 306.

The internal portion of the cone 110 includes a first outer raceway 310, a second outer raceway 312, and a third outer raceway 314. The first outer raceway 310 has a first outer diameter 316 and forms a first raceway 318 with the first inner raceway 220 for the first row of bearings 202. The second outer raceway 312 is disposed above the first outer raceway 310. The second outer raceway 312 has a second outer diameter 320 and forms a second raceway 322 with the second inner raceway 222 for the second row of bearings 206. The second row of bearings 206 in the second raceway 322 prevents the cone 110 from coming off of the leg 200. The second outer diameter 320 may be smaller than the first outer diameter 316. The third outer raceway 314 is disposed above the second outer raceway 312. The third outer raceway 314 has a third outer diameter 324 and forms a third raceway 326 with the third inner raceway 224 for the third row of bearings 210. The third outer diameter 324 may be smaller than the first outer diameter 316 and may also be smaller than the second outer diameter 320.

Figure 4:
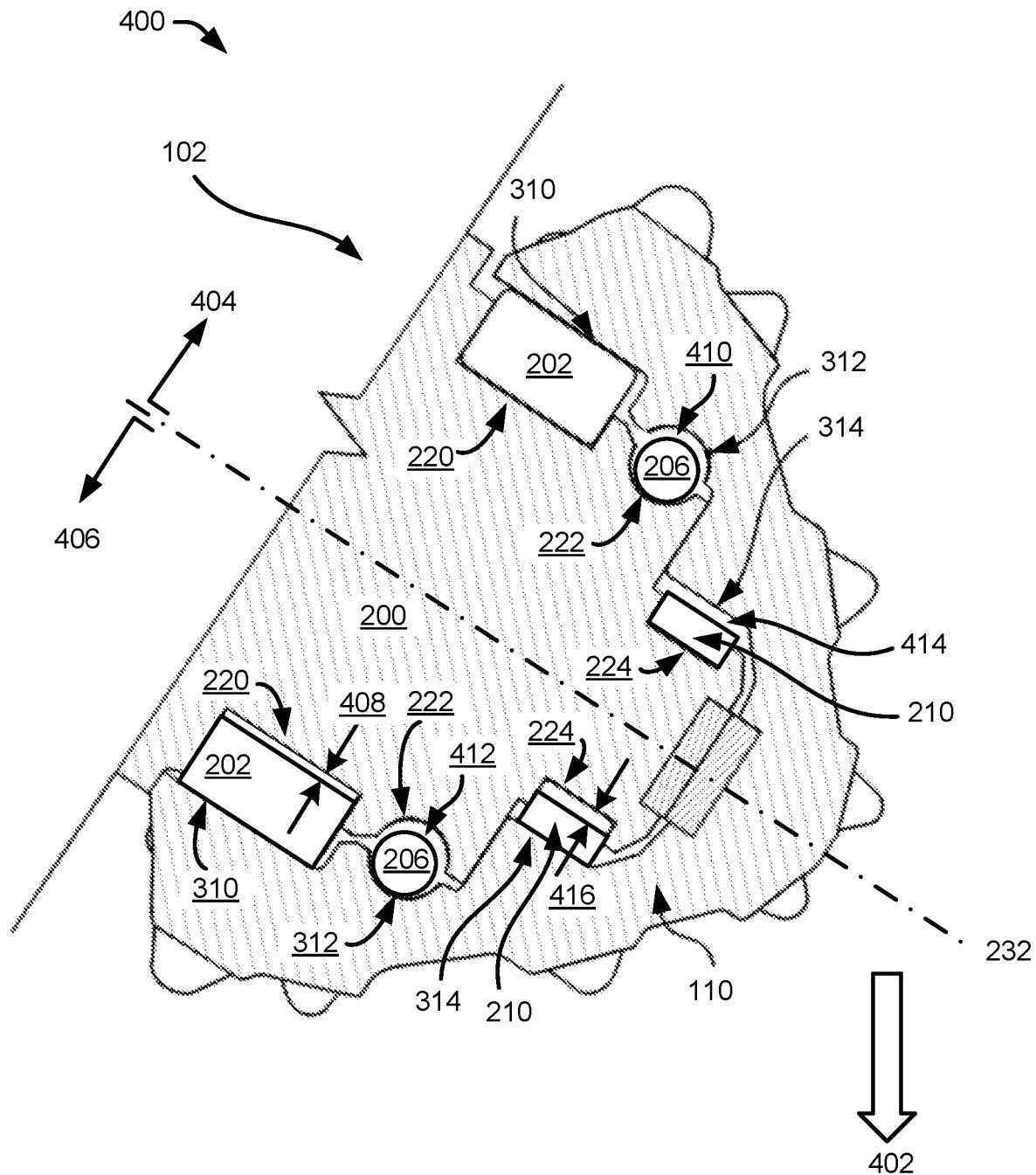
FIG. 4 illustrates a cross-sectional view of the leg assembly under no load condition.

FIG. 4 illustrates a cross-sectional view 400 of the leg assembly 102 under no load condition. The tricone bit 100 in a vertical position, the cone 110 is pulled down by gravity (shown by an arrow 402). As shown in an upper half 404 of the cone 110, the first outer raceway 310 is shown to rest on the first row of bearings 202, or at least on some of the first rolling elements 214 of the first row of bearings 202, which is shown to rest on the first inner raceway 220. In a lower half 406 of the cone 110, the first row of bearings 202, or at least some of the first rolling elements 214 of the first row of bearings 202, is shown to rest on the first outer raceway 310 without fully contacting the first inner raceway 220 having a first clearance 408. The first clearance 408 may be 50 μm±25 μm. A clearance may be measured as a difference between a gap, created by an inner raceway and outer raceway, and a diameter of a bearing in the gap. In other words, the first clearance 408 may be expressed as:

First clearance 408=(First outer diameter 316–First inner diameter 304)–2*(First diameter 226)

The second row of bearings 206 is shown to rest on the second inner raceway 222 without fully contacting the second outer raceway 312 with a second upper gap 410 in the upper half 404, and to rest on the second outer raceway 312 without fully contacting the second inner raceway 222 in the lower half 406 with a second lower gap 412. A second clearance associated with the second row of bearings 206 for the second raceway 322 provides the gaps 410 and 412. The second clearance is larger than the first clearance 408, and may measure 150 μm±25 μm. The third row of bearings 210 is shown to rest on the third inner raceway 224 without fully contacting the third outer raceway 314 with a third upper gap 414 in the upper half 404, and to rest on the third outer raceway 314 without fully contacting the third inner raceway 224 in the lower half 406 with a third lower gap 416. A third clearance associated with the third row of bearings 210 for the third raceway 326 provides the gaps 414 and 416. The third clearance is larger than the second clearance, and may measure 250 μm+25 μm.

Figure 5:
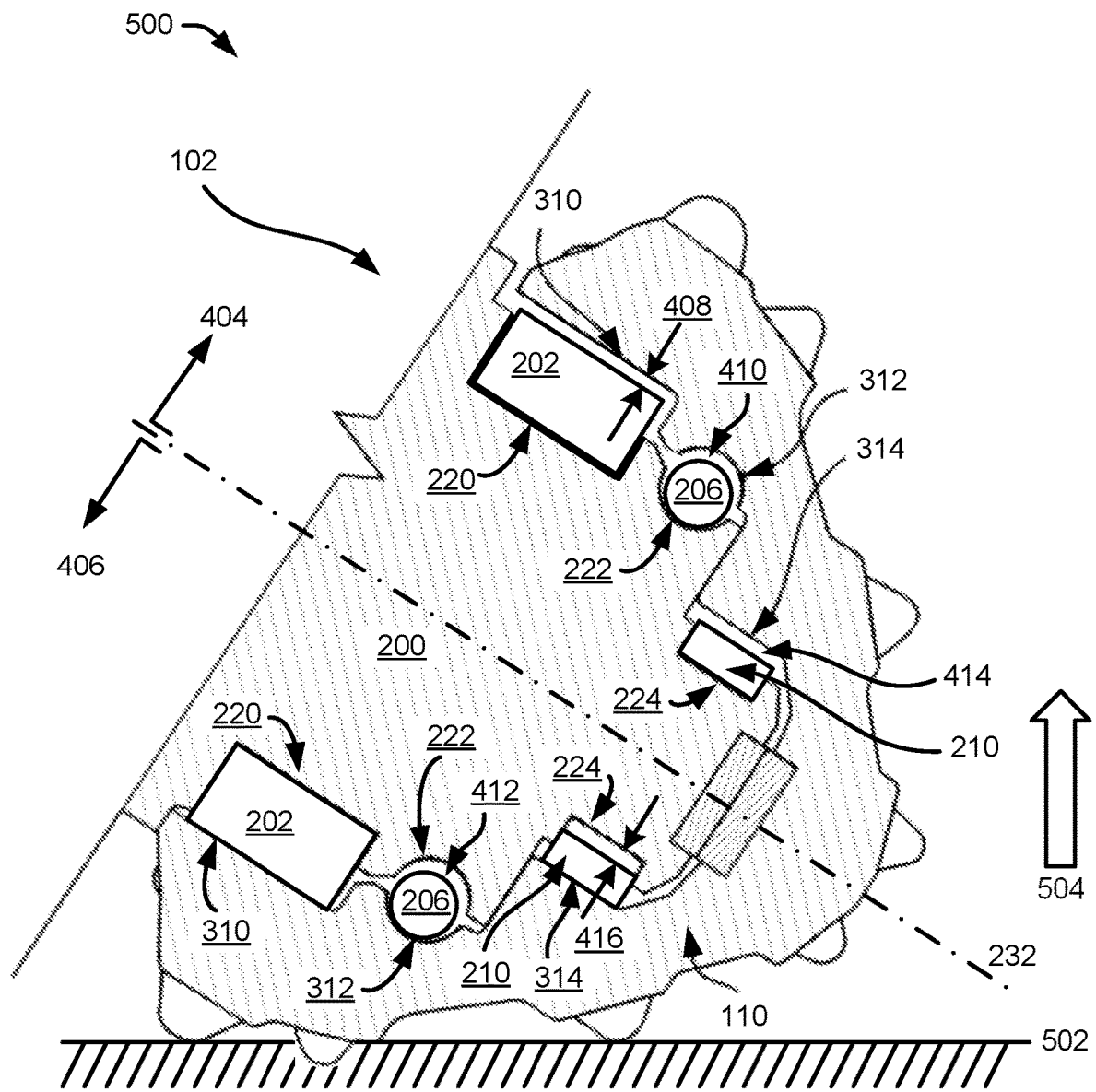
FIG. 5 illustrates a cross-sectional view of the leg assembly in a first load/wear condition.

FIG. 5 illustrates a cross-sectional view 500 of the cone 110 and the leg 200 in a first load/wear condition. As the tricone bit 100 contacts a surface 502, such as the ground, to be drilled, and is pressed onto the surface 502, the cone 110 is forced against the leg 200 in a direction as shown by an arrow 504. The force received by the cone 110 and applied to the tricone bit 100 is mostly transferred to the first row of bearings 202, which is capable of supporting higher radial load than both of the second row of bearings 206 and the third row of bearings 210. The first row of bearings 202 initially supports most of the force, thereby preventing the second row of bearings 206 and the third row of bearings 210 from premature wear due to the radial load.

As shown in the lower half 406 of the cone 110, the first outer raceway 310 is forced against the first row of bearings 202, which, in turn, is forced against the first inner raceway 220, while in the upper half 404, the first row of bearings 202 rests against the first inner raceway 220 without fully contacting the first outer raceway 310 with the first clearance 408. The second row of bearings 206 continues to rest on the second inner raceway 222 having the second upper gap 410 without fully contacting the second outer raceway 312 in the upper half 404, and to rest on the second outer raceway 312 having the second lower gap 412 without fully contacting the second inner raceway 222 in the lower half 406. The third row of bearings 210 continues to rest on the third inner raceway 224 without fully contacting the third outer raceway 314 with the third upper gap 414 in the upper half 404, and to rest on the third outer raceway 314 having the third lower gap 416 without fully contacting the third inner raceway 224 in the lower half 406.

Figure 6:
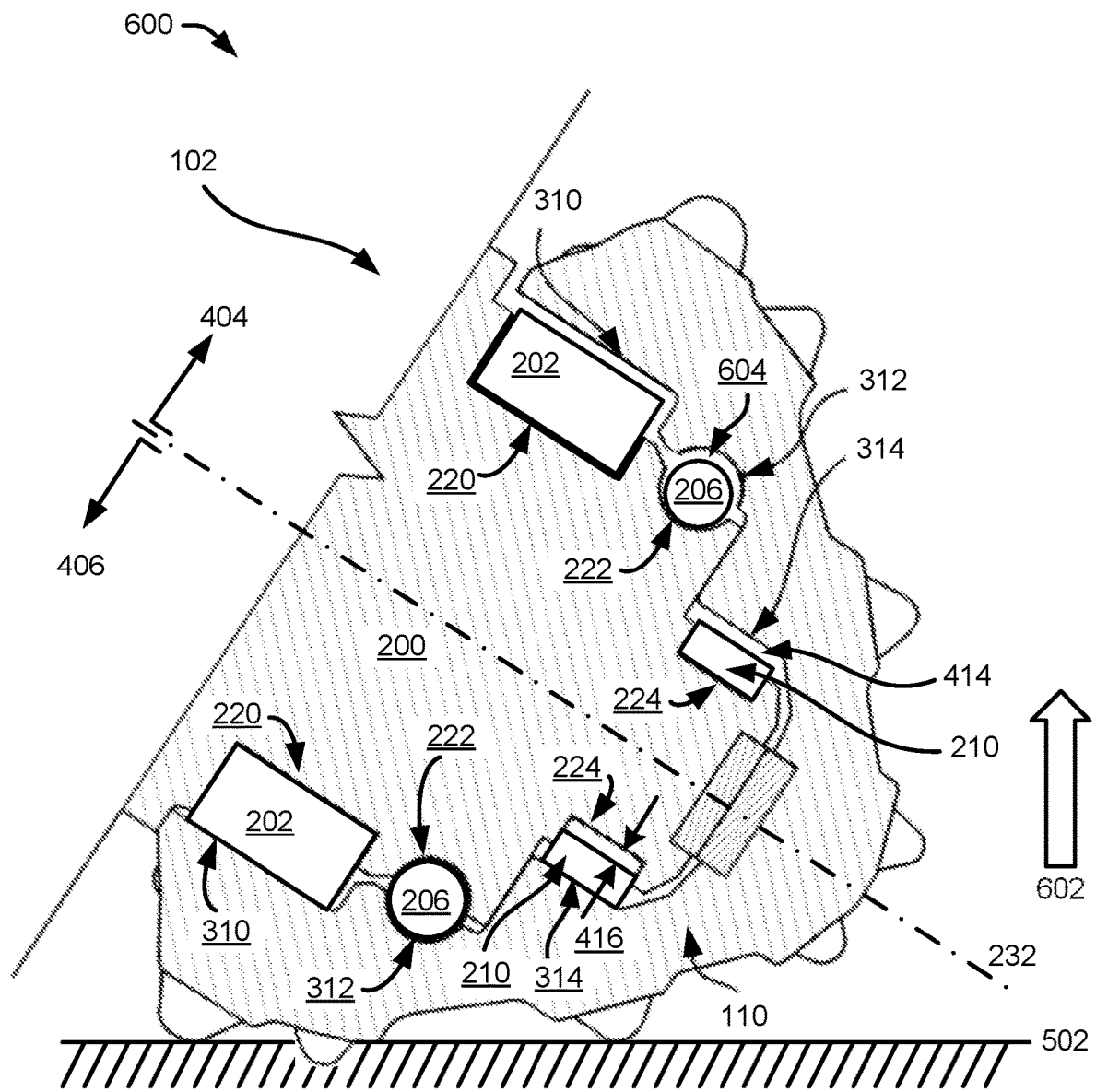
FIG. 6 illustrates a cross-sectional view of the leg assembly in a second load/wear condition.

FIG. 6 illustrates a cross-sectional view 600 of the cone 110 and the leg 200 in a second load/wear condition. In the second load/wear condition, the cone 110 may experience a higher radial load than the radial load in the first load/wear condition in FIG. 5 in a direction shown by an arrow 602, and/or the first row of bearings 202 may have worn down, such that, in the lower half 406, the second row of bearings 206 makes contact with both the second inner raceway 222 and the second outer raceway 312 in addition to the first row of bearings 202 making contact with both the first inner raceway 220 and the first outer raceway 310. In the second loaded condition, the second row of bearings 206 distributedly supports the radial load with the first row of bearings 202.

In the upper half 404, the first row of bearings 202 rests against the first inner raceway 220 without fully contacting the first outer raceway 310 and the second row of bearings 206 rests against the second inner raceway 222 without fully contacting the second outer raceway 312 with a second clearance 604. As described above, the second clearance 604 is larger than the first clearance 408 and may measure 150 µm+25 µm. The second clearance 604 may be expressed as:

Second clearance 604=(Second outer diameter 320–Second inner diameter 306)–2*(Second diameter 228)

The third row of bearings 210 continues to rest on the third inner raceway 224 without fully contacting the third outer raceway 314 with the third upper gap 414 in the upper half 404, and to rest on the third outer raceway 314 having the third lower gap 416 without fully contacting the third inner raceway 224 in the lower half 406.

Figure 7:
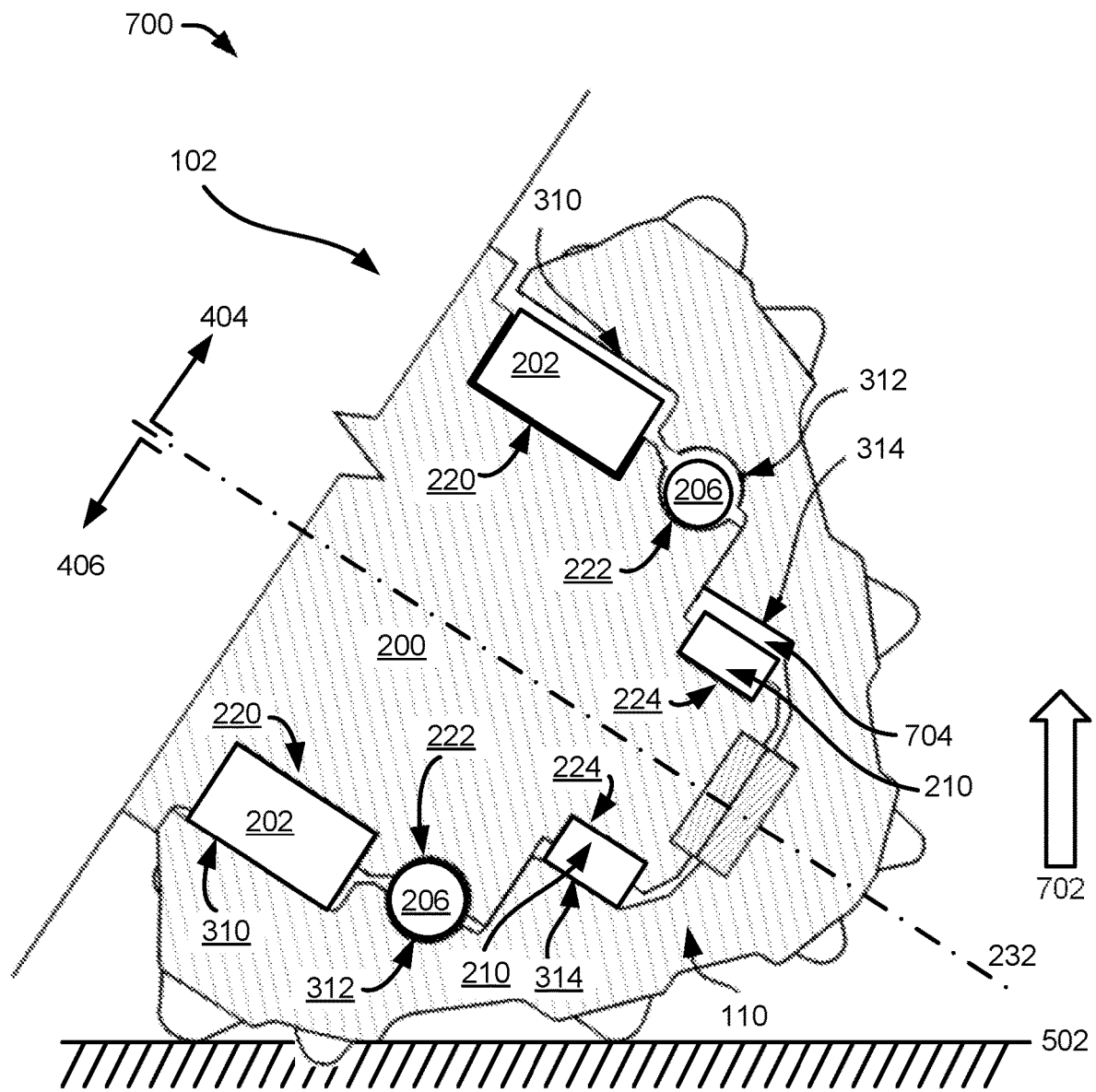
FIG. 7 illustrates a cross-sectional view of the leg assembly in a third load/wear condition.

FIG. 7 illustrates a cross-sectional view 700 of the cone 110 and the leg 200 in a third load/wear condition. In the third load/wear condition, the cone 110 may experience a higher radial load than the load in the second load/wear condition in FIG. 6 in a direction shown by an arrow 702, and/or the first row of bearings 202 and the second row of bearing 206 may have worn down, such that, in the lower half 406, the third row of bearings 206 makes contact with both the third inner raceway 224 and the third outer raceway 314 in addition to the first row of bearings 202 making contact with both the first inner raceway 220 and the first outer raceway 310 and the second row of bearings 206 making contact with both the second inner raceway 222 and the second outer raceway 312. In the third loaded condition, the third row of bearings 210 distributedly supports the radial load with the first row of bearings 202 and second row of bearings 206.

In the upper half 404, the first row of bearings 202 rests against the first inner raceway 220 without fully contacting the first outer raceway 310 and the second row of bearings 206 rests against the second inner raceway 222 without fully contacting the second outer raceway 312. The third row of bearings 210 rests against the third inner raceway 224 without fully contacting the third outer raceway 314 with a third clearance 704, which larger than the second clearance 604. As described above, the third clearance 704 is larger than the second clearance 604 and may measure 250 µm±25 µm. The third clearance 704 may be expressed as:

Third clearance 704=(Third outer diameter 324–Third inner diameter 308)2*(Third diameter 230)

The tricone bit 100 with the leg assemblies 102, 104, and 106, each having a cone 110 and a leg 200 described above with reference to FIGS. 1-7 provides a progressive loading system having three rows of bearings 202, 206, and 210, with progressively larger clearances such that the radial load applied to the tricone bit 100 is initially supported by the first row of bearings 202 having the largest bearings with a highest radial load capacity (the first rolling elements 214 with the first diameter 226) and the smallest clearance (the first clearance 408=50 µm±25 µm), followed by the second row of bearings 206 (the second rolling elements/ball bearing 216 with the second diameter 228) having medium clearance (the second clearance 604=150 µm±25 µm), further followed by the third row of bearings 210 (the third rolling elements 218 with the third diameter 230) and the largest clearance (the third clearance 704=250 µm±25 µm).

In response to the load applied to the tricone bit 100 is increased, and/or in response to the first row of bearings 202 wearing down, and then, in response to the second row of bearings 206 wearing down, the second row of bearings 206 and the third row of bearing 210 progressively and distributedly support the radial load, in addition to the first row of bearings 202, by the second row of bearings 206 contacting the second inner raceway 222 and the second outer raceway 312, followed by the third row of bearings 210 contacting the third inner raceway 224 and the third outer raceway 314.

INDUSTRIAL APPLICABILITY

The example devices of the present disclosure are applicable to a tricone bit usable in a variety of drilling applications.

For example, a leg assembly of a tricone bit may include a cone, a leg fitting inside the cone and having an axis defining an axial center of rotation of the cone. A first raceway is disposed between the cone and the leg at a distal end of the leg, referenced from the thrust button of the leg assembly, for a first row of bearings, a second raceway is disposed between the cone and the leg at a middle section of the leg for a second row of bearings, and a third raceway is disposed between the cone and the leg at a proximal end of the leg for a third row of bearings. The leg assembly of the tricone bit has a first clearance associated with the first row of bearings for the first raceway that is less than a second clearance associated with the second row of bearings for the second raceway, where the second clearance is less than a third clearance associated with the third row of bearings for the third raceway. This clearance arrangement allows the first row of bearings to initially support, in the first raceway, most of a radial load applied to the tricone bit during a drilling process. The first row of bearings, which is capable of supporting higher radial load than both of the second row of bearings and the third row of bearings, initially supports most of the load, or force, received by the cone and applied to the tricone bit, thereby preventing the second row of bearings and the third row of bearings from prematurely wearing due to the radial load.

The second row of bearings distributedly supports the radial load with the first row of bearings in response to the radial load applied to the tricone bit is increased, and the third row of bearings distributedly supports the radial load with the first row of bearings and the second row of bearings in response to the radial load applied to the tricone bit is further increased. The second row of bearings may additionally, or alternatively, distributedly support the radial load with the first row of bearings in response to the first row of bearings wearing down, and the third row of bearings may additionally, or alternatively, distributedly support the radial load with the first row of bearings and the second row of bearings in response to the first row of bearings and the second row of bearings wearing down.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A leg assembly of a tricone bit comprising:
a cone; and
a leg fitting inside the cone, the leg having an axis defining an axial center of rotation of the cone, the leg comprising:
   a first raceway disposed between the cone and the leg at a distal end of the leg and formed by a first inner wall disposed on the leg and a first outer wall defined by the cone, the first raceway containing a first row of bearings between the first inner wall and the first outer wall,
   a second raceway disposed between the cone and the leg at a middle section of the leg and formed by a second inner wall disposed on the leg and a second outer wall defined by the cone, the second raceway containing a second row of bearings between the second inner wall and the second outer wall, and
   a third raceway disposed between the cone and the leg at a proximal end of the leg and formed by a third inner wall disposed on the leg and a third outer wall defined by the cone, the third raceway containing a third row of bearings,
wherein:
a first clearance for the first row of bearings in the first raceway is less than a second clearance for the second row of bearings in the second raceway, the first clearance radially extending from the axis between the first inner wall and the first outer wall, the second clearance radially extending from the axis between the second inner wall and the second outer wall,
the second clearance is less than a third clearance for the third row of bearings in the third raceway, the third clearance radially extending from the axis between the third inner wall and the third outer wall, and
the first row of bearings supports, in the first raceway, a radial load applied to the tricone bit during a drilling process.

2. The leg assembly of claim 1, wherein:
the first row of bearings comprises a plurality of first rolling elements, each of the plurality of first rolling elements having a first diameter,
the second row of bearings comprises a plurality of ball bearings, each of the plurality of ball bearings having a second diameter, and
the third row of bearings comprises a plurality of third rolling elements, each of the plurality of third rolling elements having a third diameter, the third diameter smaller than the first diameter.

3. The leg assembly of claim 1, wherein the first row of bearings is capable of:
supporting higher radial load than the second row of bearings, and
supporting higher radial load than the third row of bearings.

4. The leg assembly of claim 1, wherein:
the first raceway has a first inner diameter and a first outer diameter, and
the third raceway has a third inner diameter and a third outer diameter, the third inner diameter being smaller than the first inner diameter and the third outer diameter being smaller than the first outer diameter.

5. The leg assembly of claim 1, wherein the second row of bearings distributedly supports the radial load with the first row of bearings in response to the radial load applied to the tricone bit is increased.

6. The leg assembly of claim 5, wherein the third row of bearings distributedly supports the radial load with the first row of bearings and the second row of bearings in response to the radial load applied to the tricone bit is further increased.

7. The leg assembly of claim 1, wherein the second row of bearings distributedly supports the radial load with the first row of bearings in response to the first row of bearings wearing down.

8. The leg assembly of claim 7, wherein the third row of bearings distributedly supports the radial load with the first row of bearings and the second row of bearings in response to the first row of bearings and the second row of bearings wearing down.

9. The leg assembly of claim 1, wherein:
the first clearance is 50 mm±25 mm,
the second clearance is 150 mm±25 mm, and
the third clearance is 250 mm±25 mm.

10. A leg assembly of a tricone bit comprising:
a leg comprising:
   a first row of bearings,
   a second row of bearing,
   a third row of bearings,
   an axis defining an axial center of rotation,
   a first inner raceway disposed at a distal end of the leg,
   a second inner raceway disposed at a middle section of the leg, and
   a third inner raceway at a proximal end of the leg; and
a cone rotatably mounted on the leg to rotate about the axis, the cone comprising:
   a first outer raceway having a first outer diameter and forming a first raceway with the first inner raceway, the first inner raceway containing the first row of bearings,
   a second outer raceway having a second outer diameter and forming a second raceway with the second inner raceway, the second raceway containing the second row of bearings, and
   a third outer raceway having a third outer diameter and forming a third raceway with the third inner raceway, the third raceway containing the third row of bearings, the third outer diameter smaller than the first outer diameter,
wherein a first clearance for the first row of bearings in the first raceway is less than a second clearance for the second row of bearings in the second raceway, the first clearance radially extending from the axis between the first inner wall and the first outer wall, the second clearance radially extending from the axis between the second inner wall and the second outer wall, and second clearance is less than a third clearance for the third row of bearings in the third raceway, the third clearance radially extending from the axis between the third inner wall and the third outer wall, and wherein, in response to a radial load applied to the tricone bit during a drilling process, the first row of bearings contacts the first inner raceway and the first outer raceway, and supports the radial load.

11. The leg assembly of claim 10, wherein the second row of bearings and the third row of bearing progressively and distributedly support the radial load by:
the second row of bearings contacting the second inner raceway and the second outer raceway, and
the third row of bearings contacting the third inner raceway and the third outer raceway.

12. The leg assembly of claim 11, wherein the second row of bearings and the third row of bearing progressively and distributedly support the radial load in response to the radial load applied to the tricone bit is increased.

13. The leg assembly of claim 11, wherein the second row of bearings and the third row of bearing progressively and distributedly support the radial load in response to the first row of bearings wearing down and in response to the second row of bearings wearing down.

14. The leg assembly of claim 10, wherein:
the first row of bearings comprises a plurality of first rolling elements, each of the plurality of first rolling elements having a first diameter, and
the third row of bearings comprises a plurality of third rolling elements, each of the plurality of third rolling elements having a third diameter, the third diameter smaller than the first diameter.

15. The leg assembly of claim 10, wherein the first row of bearings is capable of:
supporting higher radial load than the second row of bearings, and
supporting higher radial load than the third row of bearings.

16. The leg assembly of claim 10, wherein:
the first clearance is 50 mm±25 mm,
the second clearance is 150 mm±25 mm, and
the third clearance is 250 mm±25 mm.

17. A tricone bit comprising three leg assemblies, each leg assembly comprising:
a cone; and
a leg fitting inside the cone, the leg having an axis defining an axial center of rotation of the cone, the leg comprising:
a first raceway disposed between the cone and the leg at a distal end of the leg assembly and formed by a first inner wall disposed on the leg and a first outer wall defined by the cone, the first raceway containing a first row of bearings between the first inner wall and the first outer wall,
a second raceway disposed between the cone and the leg at a middle section of the leg assembly and formed by a second inner wall disposed on the leg and a second outer wall defined by the cone, the second raceway containing a second row of bearings between the second inner wall and the second outer wall, and
a third raceway disposed between the cone and the leg at a proximal end of the leg assembly and formed by a third inner wall disposed on the leg and a third outer wall defined by the cone, the third raceway containing a third row of bearings, wherein:
a first clearance for the first row of bearings in for the first raceway is less than a second clearance for the second row of bearings in the second raceway, the first clearance radially extending from the axis between the first inner wall and the first outer wall, the second clearance radially extending from the axis between the second inner wall and the second outer wall,
the second clearance is less than a third clearance for the third row of bearings in the third raceway, the third clearance radially extending from the axis between the third inner wall and the third outer wall, and
the first row of bearings supports, in the first raceway, a radial load applied to the tricone bit during a drilling process.

18. The tricone bit of claim 17, wherein the second row of bearings and the third row of bearing progressively and distributedly support the radial load by:
the second row of bearings contacting a second inner raceway and a second outer raceway of the second raceway, and
the third row of bearings contacting a third inner raceway and a third outer raceway of the third raceway.

19. The tricone bit of claim 17, wherein the first row of bearings is capable of:
supporting higher radial load than the second row of bearings, and
supporting higher radial load than the third row of bearings.

20. The tricone bit of claim 17, wherein:
the first clearance is 50 mm±25 mm,
the second clearance is 150 mm±25 mm, and
the third clearance is 250 mm±25 mm.

* * * * *